United States Patent [19]

Lichtenberg

[11] Patent Number: 5,555,769
[45] Date of Patent: Sep. 17, 1996

[54] CABLE OPERATED ROTARY CONTROL ASSEMBLY

[75] Inventor: Norman B. Lichtenberg, Troy, Mich.

[73] Assignee: Teleflex Incorporated, Plymouth Meeting, Pa.

[21] Appl. No.: 434,094

[22] Filed: May 3, 1995

[51] Int. Cl.⁶ .................. F16C 1/10; F25B 29/00
[52] U.S. Cl. ............... 74/89.22; 74/89.15; 74/501.5 R; 74/517; 454/69
[58] Field of Search .................. 74/89.15, 89.22, 74/500.5, 501.5 R, 505, 506, 517; 165/16, 42; 237/12.3 A; 454/69

[56] References Cited

U.S. PATENT DOCUMENTS

| | | | |
|---|---|---|---|
| 1,980,172 | 11/1934 | Ball | 74/501.5 R |
| 4,041,797 | 8/1977 | Mito | 74/500.5 |
| 4,112,784 | 9/1978 | Cosh | 74/501.5 R |
| 4,235,046 | 11/1980 | Hess et al. | |
| 4,400,993 | 8/1983 | Kobayashi et al. | 74/501.5 R |
| 4,936,159 | 6/1990 | Kallio | 74/501.5 R |
| 5,129,281 | 7/1992 | Van Zanten et al. | 74/501.5 R |
| 5,235,866 | 8/1993 | Truman et al. | 74/89.22 |
| 5,301,563 | 4/1994 | Van Zanten et al. | 74/501.5 R |

FOREIGN PATENT DOCUMENTS 52-41788  3/1977  Japan ................. 74/501.5 R

*Primary Examiner*—Charles A. Marmor
*Assistant Examiner*—Troy Grabow
*Attorney, Agent, or Firm*—Howard & Howard

[57] ABSTRACT

A rotary control device which includes an output pulley housing and an output pulley rotatably mounted therein. A cable is at least partially wrapped around the output pulley and passed through a cable housing that is slidably mounted on the output pulley housing. The output pulley rotates in response to the movement of the cable. A spring mechanism is positioned between the output pulley housing and the cable housing to bias the pulley housing away from the cable housing to take up any slack in and tension in the cable. Furthermore, the output pulley or the input pulley or both can include a cam lobe or lobes formed on its periphery where the cable wraps therearound to control the torque output of the assembly.

9 Claims, 3 Drawing Sheets

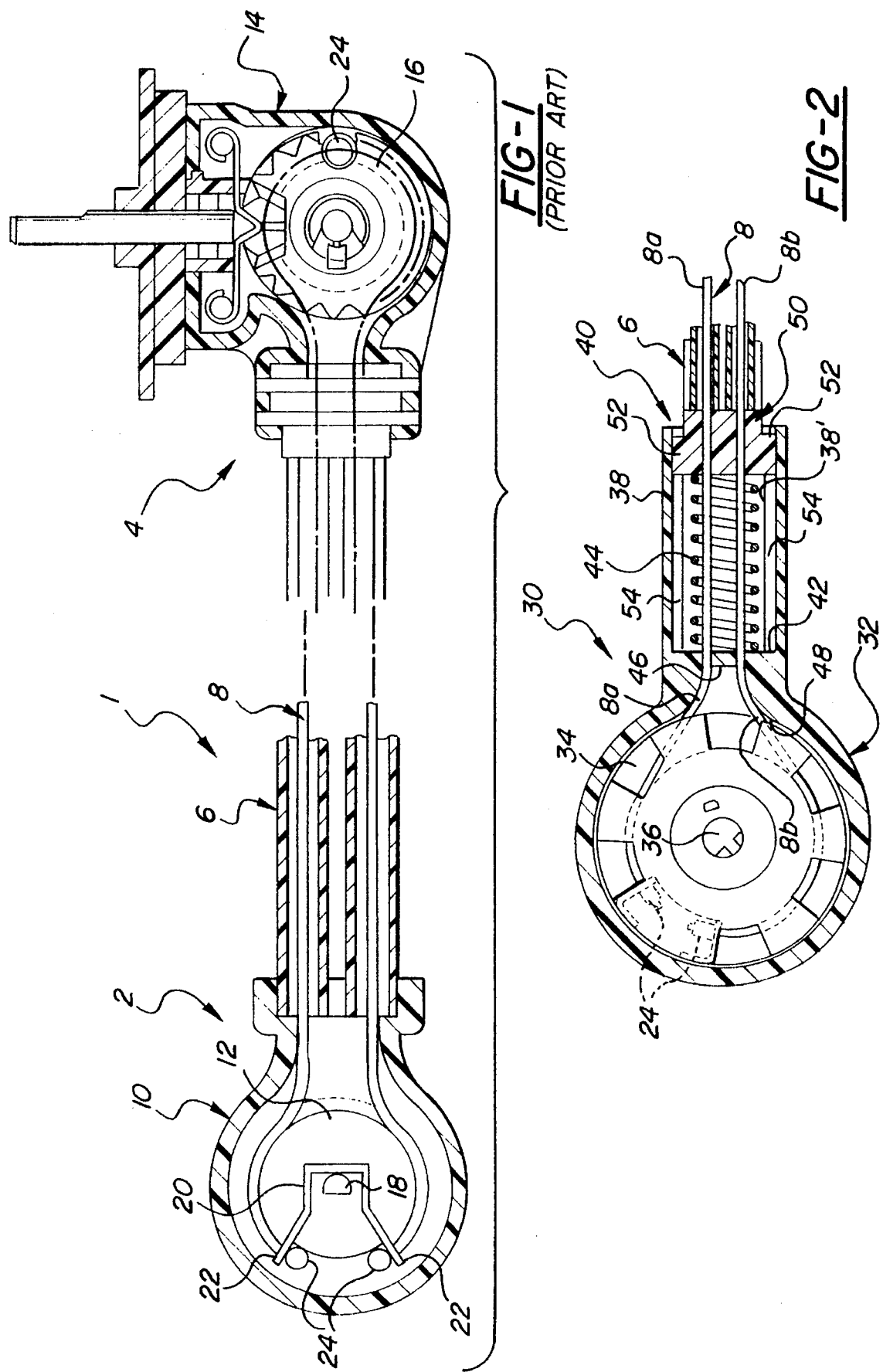

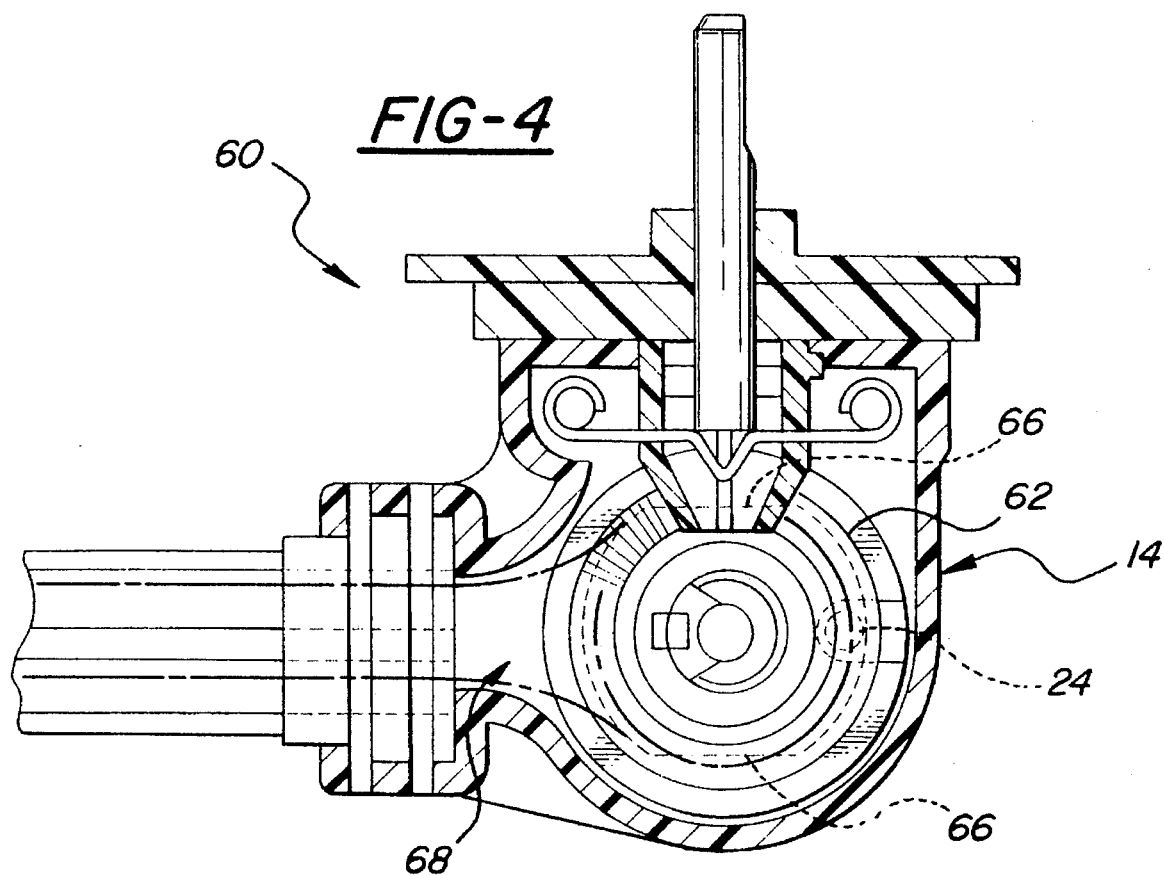
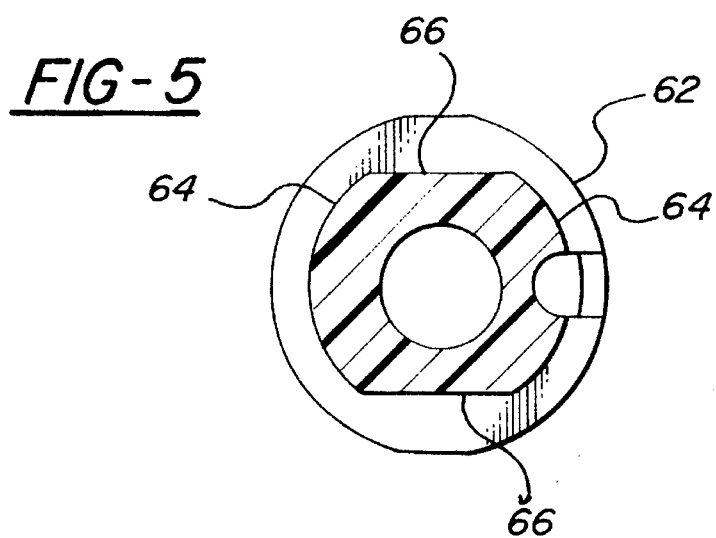

CABLE OPERATED ROTARY CONTROL ASSEMBLY

FIELD OF THE INVENTION

The present invention relates to a rotary control device, in particular to a rotary temperature control device for automotive heating, ventilation and air-conditioning (HVAC) units.

BACKGROUND

Cable operated rotary temperature control devices are presently available for controlling opening and closing of a vent or the like in a HVAC unit. These devices typically comprise an output pulley and an input pulley with a cable wrapped around them to impart rotary movement to a vent door or the like connected to the output pulley. The input pulley rotates the output pulley and hence controls any unit connected thereto. Such cable operated control devices need a mechanism for taking up slack to effectively control the unit connected to the output pulley. In this regard, U.S. Pat. No. 4,936,159 issued to Kallio and 5,129,281 and 5,301,563 issued to Van Zanten et al, and 5,235,866 issued to Truman, et al. disclose cable operated rotary temperature control devices.

The '866 patent, assigned to the assignee of the present application, discloses a rotary temperature device having input and output pulleys connected by a cable and a spring mechanism connected between the output pulley and the cable for initially taking up slack in the system. The disclosure of the '866 patent is incorporated herein by reference.

The '159 patent also discloses a rotary control device with a spring on one or both ends of the cable and positioned in holes formed in the output pulley.

The '281 patent discloses a rotary control device with a slack adjustment mechanism which, in turn, includes an adjustable spring mechanism at each end of the cable and a plurality of cooperating ratchet-like stops formed within the output pulley. A movable retainer member holds each end of the cable relative to the output pulley in any of a number of adjusted positions. The slack in the cable is thereby adjusted by pushing the retainer member away from the spring, with the ratchet-like stops maintaining the retainer member in position.

The '563 patent discloses a number of slack adjustment mechanisms formed within the output pulley. These mechanisms operate in a manner similar to the constructions of the '281 patent to adjust the amount of slack in the system.

In all of the devices discussed above, the spring is contained entirely within the output pulley and can only provide limited slack control. This is because of the constraints imposed on the slack control mechanism due to the shape and size of the output pulley and housing. Without unduly enlarging the size of the output pulley and housing, any spring mechanism used for taking up initial slack or for adjusting the slack in the system must be small in size. This, in turn, permits only a limited amount of spring movement. The inclusion of the spring mechanism on the output pulley also takes up space which might otherwise be used for other control mechanisms.

SUMMARY

In the present invention, the slack control mechanism is removed from the output pulley and placed in the system where it provides a greater range of control. The rotary control device of the present invention includes a rotary output device, an input device, and means for operatively connecting the input device to the output device. The rotary output device preferably comprises an output pulley housing and an output pulley rotatably connected thereto, while the input device can be any device capable of moving a cable. The input device preferably comprises an input pulley housing and an input pulley rotatably connected thereto. The connecting means preferably is a cable housing. One end of the cable housing is connected to the output pulley housing and the other end thereof to the input pulley housing. The cable at least partially wraps around the input pulley, is routed through the cable housing and at least partially wraps around the output pulley so that the output pulley rotates in response to rotation of the input pulley.

According to the present invention, a spring is positioned between the output pulley housing and one end of the cable housing. Another spring can also be included between the input pulley housing and the other end of the cable housing to provide an even greater range of slack take up. The spring is positioned to bias the output pulley away from the input device to lengthen the effective distance therebetween, thus taking up slack and tensioning the cable.

Furthermore, according to another aspect of the present invention, the output or input pulley or both can include a radially outwardly extending cam lobe formed on its periphery where the cable wraps therearound. The cam lobe increases application of torque applied to any unit connected to the output pulley as the output pulley is rotated.

BRIEF DESCRIPTION OF THE DRAWINGS

FIG. 1 is a plan view of a prior art rotary control device having a rotary output pulley connected to a rotary input pulley via a cable housing and a cable;

FIG. 2 is a plan view of a rotary output device with a helical spring according to one aspect of the present invention;

FIG. 4 is a plan view of the rotary input pulley with cam lobes according to another aspect of the present invention; and FIG. 5 is a cross section of the input pulley of FIG. 4.

DETAILED DESCRIPTION OF THE INVENTION

Figure 3A:
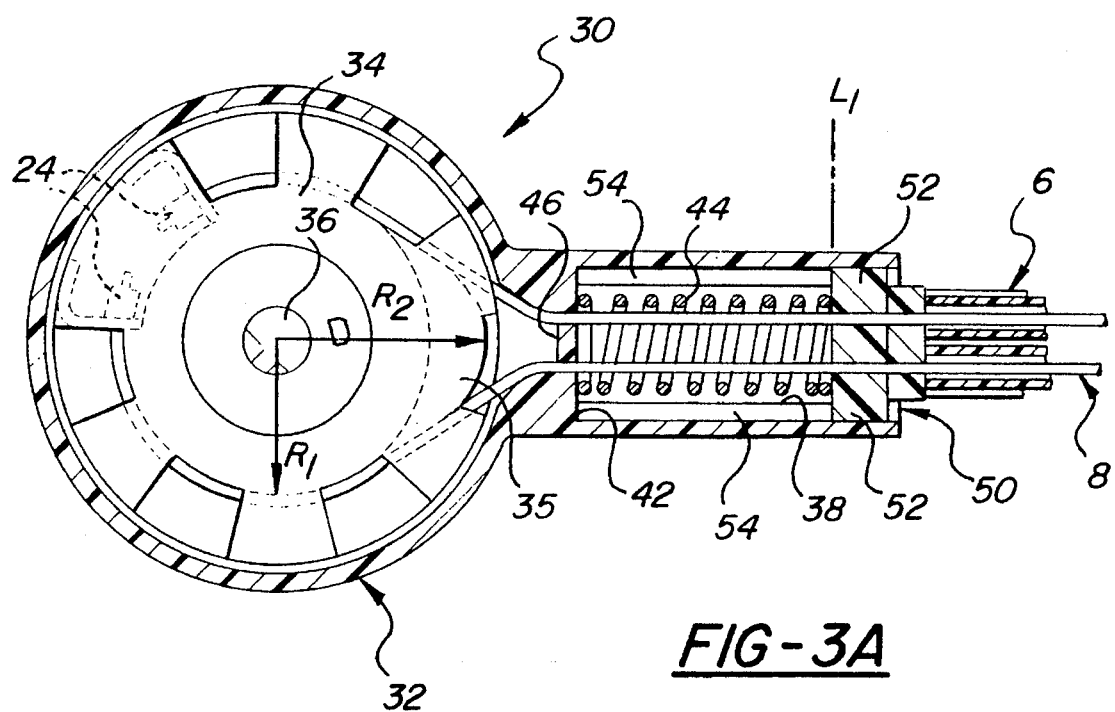
FIGS. 3A and 3B are plan views according to another aspect of the present invention that is similar to the embodiment shown in FIG. 2, but with a cam lobe formed on the output pulley, FIG. 3A showing the cam lobe at a first position and FIG. 3B showing the cam lobe at a second position.

FIG. 1 shows a prior art rotary temperature device 1 described in the '866 patent, which comprises a rotary output device 2 and a rotary input device 4 connected to the output device 2 using a cable housing 6 and a flexible cable 8. The output device 2 has an output pulley housing 10 and an output pulley 12 rotatably mounted therein. The input device 4 has an input pulley housing 14 and an input pulley 16 rotatably mounted therein. The output pulley 12 transfers motion, for example, to a blend door of the plenum of a vehicle. The output pulley 12 has a central bore 18 for mounting, for example, a shaft of the blend door. An opening in alignment with the bore 18 is also present in the output housing 10 to permit the shaft to pass therethrough. The output pulley 12 also has a mechanism for initially taking up slack in the system comprised of a wire spring 20 received in a recess formed in the output pulley 12. The wire spring 20 has a pair of opposed spring arms 22. The flexible cable 8 is partially wrapped around the input pulley 16, routed through the cable housing 6 and partially wrapped around the output pulley 12. Each of the two ends of the cable 8 is detachably secured to the ends of the spring arms using enlarged end members in the form of T-slugs or balls 24. The cable 8 is also secured with another enlarged member 24 to the input pulley 16. The spring arms 22 are biased so that they are drawn toward each other, thus pulling the ends of the cable 8 toward each other to take up slack.

Figure 3B:
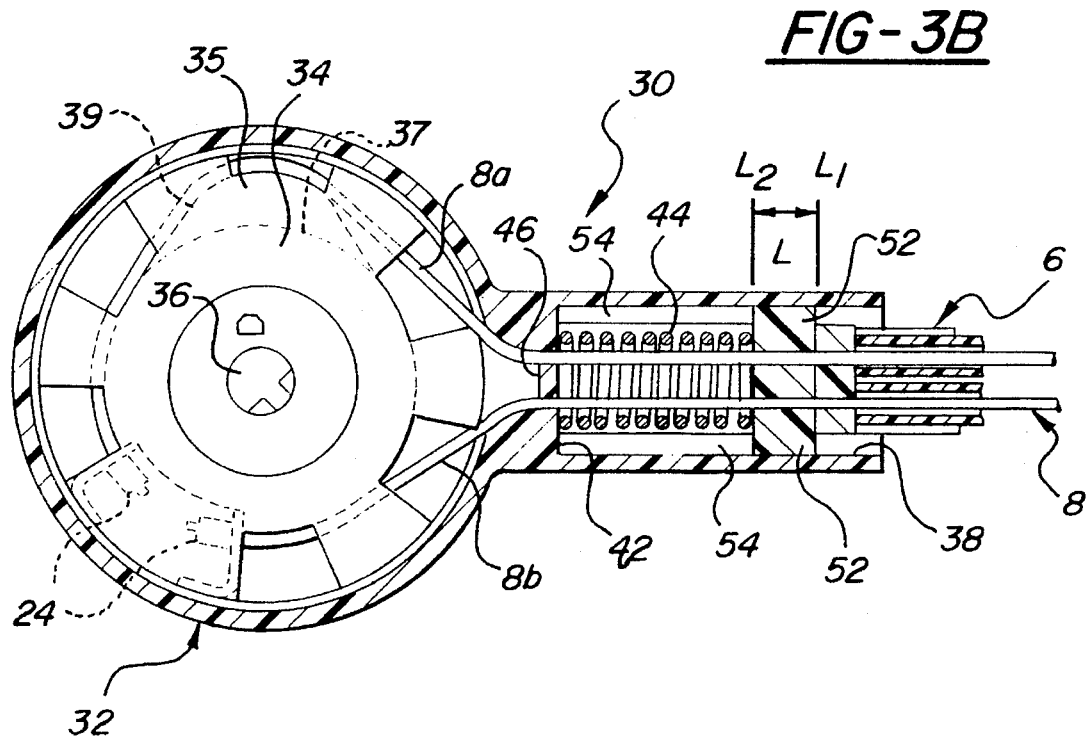

FIGS. 2, 3A and 3B show a rotary output device 30 according to the present invention, which can be used for controlling movement such as vent door for opening and closing a HVAC, automotive shift controls, window blind operators, furniture recliner operators, etc. However, the present invention is not to be restricted to these applications as it can be used with other similar devices. The rotary output device 30 can be used with the rotary input device described in the '866 patent or with any other conventional means for moving the cable.

FIG. 2 shows one aspect of the rotary output device 30 which comprises an output pulley housing 32 and a circular output pulley 34 rotatably mounted therein. The pulley has an opening 36 for accepting an output shaft or the like to transmit rotational power. The housing 32 also has a central opening (not shown) slightly larger than the pulley opening 36 to permit the output shaft to extend through the housing so as to be connected to the unit to be controlled by the output pulley 34.

The output pulley housing 32 is generally circular to house the circular pulley 34 and has a generally longitudinal extension 38. The extension 38 has a passageway 38' with an open free end 40 and an opposite end wall 42. The passageway 38' is dimensioned to seat a spring mechanism such as coil spring 44 as well as to accommodate an end portion of the cable housing 6. The end wall 42 has a slot or opening 46 to allow the two segments 8a and 8b of the cable 8 to pass therethrough. Adjacent to the opening 46, the housing 32 includes a curved wall 48 that acts as a bearing surface for guiding the two cable segments 8a, 8b through the opening 46 and around the output pulley 34.

The spring 44 is compressed between the end wall 42 and the end of a cable housing 6 with one end abutting the end wall 42 of the pulley output housing and the other end abutting a ferrule 50 provided on the end of the cable housing 6. The ferrule 50 has a pair of opposed lateral guides 52 which can slide along a pair of opposed guide channels 54 formed in the passageway 38'. The guide channels 54 also prevent the two spaced and side by side segments 8a, 8b of the cable 8 from twisting by preventing the cable housing 6 from rotating relative to the output pulley housing 32.

The spring 44 and the end of the cable housing 6 are axially aligned, in the extension, along the longitudinal direction of the cable segments 8a, 8b in the cable housing 6. The two segments 8a, 8b of the cable 8 extend in spaced relation through the cable housing 6 from an input device, such as the rotary input device 4 described above or the rotary input device 60 shown in FIG. 4. The cable is wrapped around the output pulley 34 so that it rotates in response to the movement of the cable 8. More particularly, one segment 8a of the cable, adjacent one of its ends, is wrapped about one peripheral side of the output pulley 34 and another segment 8b, adjacent the other end of the cable, is wrapped about the diametrically opposite side of the pulley 34. The ends of the cable segments 8a, 8b are connected to the pulley 34 by way of the enlarged end members 24.

Although the drawings only depict the spring positioned in the passageway 38' of the output pulley housing, another spring can be positioned in a passageway similarly formed in the input pulley housing 14 of either of the rotary input devices 4, 60. A spring at each end of the cable housing 6 provides an additional range of length adjustment to accommodate any cable slack developed during use. In each instance, one end of the spring abuts against the pulley housing and the other end thereof against the cable housing.

The spring 44, as shown in FIG. 2, biases the output pulley 34 away from the input device to lengthen the effective distance therebetween, thus taking up slack and resiliently tensioning the cable. Although the drawings depict the preferred spiral or helical coil spring 44, the spring may be any biasing means such as a compressible resilient member, an elastic rubber, compression spring, pneumatic spring, etc.

The cable 8 is preferably a single strand of conventional cable, either monofilament or multifilament, with its ends secured to the output pulley 34 as shown in FIGS. 2, 3A and 3B using conventional T-slugs or balls 24. Also, the cable is secured to the input pulley 16 using, for instance, a T-slug or ball 24, as shown in FIGS. 1 and 4, to prevent the cable slipping relative to the input pulley. The cable need not be secured to either pulley as it can be made endless by joining the ends of the cable together and maintaining the cable in sufficient tension to prevent the cable from slipping relative to the pulleys.

According to another aspect of the present invention, as shown in FIGS. 3A and 3B, the rotary output device 30 is provided with means for increasing the torque output. Specifically, the output pulley 34 includes a radially outwardly extending cam lobe 35 formed on a portion of its outer periphery where the cable wraps therearound. The cam lobe 35 increases the torque output by increasing the output pulley radius by an amount defined by the difference between $R_1$ and $R_2$, wherein $R_1$ is the minimum radius and $R_2$ is the maximum radius of the circular output pulley 34. The tension of the cable 8 as well as the torque output is at a minimum when the output pulley is in a first rotative position as shown in FIG. 3A. In this position of the pulley, the cam lobe 35 is disposed between the cable segments and axially aligned with the extension 36 and along the longitudinal direction of the cable segments 8a, 8b in the cable housing 6. The tension is greatest beginning in a second rotative position of the output pulley 34, as shown in FIG. 3B. Here, one segment 8a of the cable on one side of the pulley 34 is wrapped around the cam lobe 35 while the cam lobe 35 is spaced laterally from axial alignment with the longitudinal direction of the cable segments 8a, 8b in the cable housing 6. It is to be noted, however, that the cam lobe number, shape and position can be varied to produce different torque characteristics.

The input pulley can similarly have a cam lobe of the type shown in FIGS. 3A and 3B. Alternatively, cam lobes 64 as shown in FIGS. 4 and 5 can be provided. FIG. 4 shows an input device 60 which is substantially similar to the input device 4 shown in FIG. 1. However, the input pulley 62 is provided with a pair of diametrically opposed cam lobes 64, as better shown in FIG. 5. The input device 60 can be used with the output device 30, with or without the cam 35 formed in the output pulley 34. The input pulley 62 has a pair of diametrically opposed flat surfaces 66 that reduces the effective length of the cable wrapping around the input pulley 62. This enables the cable wrapping therearound to be in a relaxed condition when the flat surfaces 64 are positioned as shown in FIG. 4, where the cam lobes are generally aligned with the passageway 68 formed in the input housing and the cable is wrapped around only one of the cam lobes 64. The tension is greatest when the input pulley 62 is rotated about 90° to where the cable wraps around both cam lobes 64. Here, the effective amount of the cable wrapping around the pulley 60 is greatest. Again, it should be noted that the cam lobe shape, the position and the number thereof can be varied to produce different torque characteristics.

When either of the cam lobes 35, 64 are used on a pulley, the pulley in essence is no longer circular. Therefore, there will be variations in the effective length of the cable as the cable wraps around the cam lobe or lobes. For instance, at the first position, as shown in FIGS. 3A and FIG. 4, the cable is at its lowest tension and at its longest total effective length between the input and output pulleys. As the output pulley 34 rotates in either direction (counterclockwise direction as shown in FIGS. 3A and 3B), it will continually decrease the effective total length of the cable as the amount of cable wrapping around the pulley increases. Accordingly, if the cam lobe is used, it requires a use of length accommodating means. In the present invention, this is accomplished by the spring 44 positioned between the output pulley and the input device as described above.

In operation, the cable is moved by rotating the input device so as to move the segments 8a, 8b of the cable relative to each other along their longitudinal axes so that the output pulley 34 rotates in the counterclockwise direction from the first position shown in FIG. 3A to the second position shown in FIG. 3B. During this rotation, the tension of the cable 8 increases due to the cable wrapping around a generally larger arc of a radius $R_2$. This has the net effect of shortening the cable. To accommodate for the length difference, the spring 44 has to be further compressed as shown in FIG. 3B, from a first point $L_1$ where the spring is at a first compression to a second point $L_2$ where the spring is at a second compression greater than the first compression. The distance L, between $L_1$ and $L_2$, is proportional to the difference in length of the cable spanning across the circular arc path 37 of the pulley 34 and the length of the cable spanning from the same points across the cam lobe arc path 39. The spring 44 according to the present invention should allow at least a spring compression equal to L so as to accommodate for the cable length difference. If the input pulley also has the cam lobe or lobes, the spring or springs additionally need to accommodate for the compression produced by both the input pulley and the output pulley.

From the above, it will be appreciated that according to the present invention, the spring mechanism 44 not only functions to take up slack in the cable to thereby continuously maintain the Cable under proper tension, the spring also functions to permit a torque adjustment in the output force from the output pulley. This double function is possible because of the construction and location of the spring mechanism.

I claim:

1. A rotary control assembly for imparting rotary movement, said assembly comprising:

an output housing;

an output pulley rotatably mounted on said housing;

a cable wrapped about the periphery of said pulley and extending in first and second segments away from said pulley to a spaced location;

an input device at said spaced location for moving said segments of said cable relative to each other to rotate said pulley;

a cable housing extending from said housing and along said first and second segments of said cable;

biasing means for urging said output housing and said cable housing apart to take up slack in said cable between said output pulley and said input device, and a radially outwardly extending cam lobe on the periphery of said output pulley for disposition out of engagement with said cable in a first rotative position of said pulley and disposition underlying said cable in a second rotative position of said pulley.

2. The improvement in a rotary control assembly according to claim 11 wherein:

a) said output housing includes an extension disposed along said longitudinal direction for slidably receiving one end of said cable housing; and b) said biasing means includes a spring mechanism disposed within said extension.

3. The improvement in a rotary control assembly according to claim 2 wherein:

a) said spring mechanism is a coil spring aligned along said longitudinal direction with one end abutting against said output pulley housing and its other end against the cable housing; and b) said segments of said cable extend longitudinally through said coil spring.

4. The improvement in a rotary control assembly according to claim 1 wherein:

a) said cable segments extend away from said output pulley in spaced relation to each other; and b) said cam lobe is disposed between said segments of said cable, where said segments extend away from said output pulley, in said first rotative position of said output pulley.

5. The improvement in a rotary control assembly for imparting rotary movement to a cable having a rotary output device comprising an output housing and an output pulley rotatably mounted in said output housing, a cable having a longitudinal axis and a first segment and second segment wrapped, respectively, about diametrically opposite sides of said pulley and further extending away from said pulley to a spaced location, an input device at said spaced location, said input device comprising an input housing and an input pulley rotatably mounted in said input housing, said input pulley being connected to said first and second segments of said cable for moving said segments relative to each other along their longitudinal axes to rotate said output pulley, and a cable housing connecting said output housing to said input housing and through which said first and second segments of said cable extend in a longitudinal direction, the improvement comprising:

a) biasing means for resiliently tensioning said cable between said output pulley and said input pulley to take up any slack in said cable; and b) at least one radially outwardly extending cam lobe on the periphery of at least one of said pulleys, each of said cam lobes being positioned in axial alignment along said longitudinal direction in a first rotative position of the pulley on which said lobe is provided and spaced laterally from said axial alignment and underlying said cable in a second rotative position of the pulley on which said lobe is provided.

6. The improvement in a rotary control assembly according to claim 5 further comprising:

a) means for mounting at least one of said output and input housings on said cable housing for sliding movement along said longitudinal direction and away from said cable housing.

7. The improvement in a rotary control assembly according to claim 6 wherein:
   a) said output housing includes an extension disposed along said longitudinal direction for slidably receiving one end of said cable housing; and
   b) said biasing means includes a spring mechanism disposed within said extension for urging said output housing away from said cable housing.

8. The improvement in a rotary control assembly according to claim 7 wherein:
   a) said cable segments extend away from said output pulley and said input pulley in spaced relation to each other; and
   b) one of said cam lobes is provided on said output pulley and disposed between said segments of said cable, where said segments extend away from said output pulley, in said first rotative position of said output pulley.

9. The improvement in a rotary control assembly according to claim 8 wherein:
   a) a pair of diametrically disposed cam lobes are provided on said input pulley with said pair being positioned in axial alignment along said longitudinal direction in a first rotative position of said input pulley and spaced laterally from said axial alignment and underlying said cable in a second rotative position of said input pulley.

* * * * *